(12) United States Patent
Rossi et al.

(10) Patent No.: US 11,073,642 B2
(45) Date of Patent: Jul. 27, 2021

(54) MINIATURIZED OPTICAL DEVICES, SUCH AS SPECTROMETERS AND SPECTROMETER MODULES, AND THEIR MANUFACTURE

(71) Applicant: ams Sensors Singapore Pte. Ltd., Singapore (SG)

(72) Inventors: Markus Rossi, Jona (CH); Hartmut Rudmann, Jona (CH); Bassam Hallal, Thalwil (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 131 days.

(21) Appl. No.: 16/334,239

(22) PCT Filed: Sep. 15, 2017

(86) PCT No.: PCT/SG2017/050464
§ 371 (c)(1),
(2) Date: Mar. 18, 2019

(87) PCT Pub. No.: WO2018/056901
PCT Pub. Date: Mar. 29, 2018

(65) Prior Publication Data
US 2019/0383979 A1 Dec. 19, 2019

Related U.S. Application Data

(60) Provisional application No. 62/396,900, filed on Sep. 20, 2016.

(51) Int. Cl.
*G02B 5/18* (2006.01)
*G01J 3/02* (2006.01)
(Continued)

(52) U.S. Cl.
CPC ......... *G02B 5/1814* (2013.01); *G01J 3/0208* (2013.01); *G01J 3/0262* (2013.01);
(Continued)

(58) Field of Classification Search
CPC .... G02B 5/1814; G02B 5/10; G02B 27/4244; G02B 17/00; G02B 5/18; G01J 3/0208;
(Continued)

(56) References Cited

U.S. PATENT DOCUMENTS

2002/0025129 A1* 2/2002 Biscardi ............... H04N 9/3102
385/120
2002/0118907 A1 8/2002 Sugama et al.
(Continued)

FOREIGN PATENT DOCUMENTS

CN 103557939 A * 2/2014
CN 103557939 A 2/2014
(Continued)

OTHER PUBLICATIONS

ISA/SG, International Search Report for PCT/SG2017/050465 (dated Nov. 7, 2017).
(Continued)

*Primary Examiner* — Marin Pichler
*Assistant Examiner* — Henry A Duong
(74) *Attorney, Agent, or Firm* — Michael Best and Friedrich LLP

(57) ABSTRACT

A method for manufacturing an optical device comprising providing a plurality of initials bars each having a first side face presented with a first optical component arrangement; positioning the initial bars in a row with their first side faces facing a neighboring one of the initial bars; fixing the initial bars to obtain a bar arrangement; obtaining prism bars by segmenting the bar arrangement by at least one of the steps: conducting a plurality of cuts so that each prism bar com-
(Continued)

prises a portion of at least two different ones of the initial bars, separating the bar arrangement into sections along cut lines or by creating cut faces at an angle with initial-bar directions; dividing the first optical component arrangement for obtaining a plurality of passive optical components, wherein each prism bar comprises one or more passive optical components comprising a first reflective face each which is of non-planar shape; segmenting prism bars into parts.

15 Claims, 4 Drawing Sheets

(51) Int. Cl.
  G01J 3/18   (2006.01)
  G02B 5/10   (2006.01)
  G02B 27/42   (2006.01)
(52) U.S. Cl.
  CPC ............... G01J 3/18 (2013.01); G02B 5/10 (2013.01); G02B 27/4244 (2013.01); G01J 3/0256 (2013.01)
(58) Field of Classification Search
  CPC .......... G01J 3/0262; G01J 3/18; G01J 3/0256; G01J 3/02
  USPC ........................................................ 359/558
  See application file for complete search history.

(56) References Cited

U.S. PATENT DOCUMENTS

| | | | |
|---|---|---|---|
| 2009/0065132 A1* | 3/2009 | Yamamoto | B32B 37/02 |
| | | | 156/248 |
| 2013/0279017 A1 | 10/2013 | Amitai | |
| 2016/0216524 A1 | 7/2016 | Deng et al. | |
| 2017/0167917 A1* | 6/2017 | Yokino | G01J 3/0286 |

FOREIGN PATENT DOCUMENTS

| | | | | |
|---|---|---|---|---|
| TW | 201538957 A | 10/2015 | | |
| TW | 201802440 A | 1/2018 | | |
| WO | WO-2012071674 A1 * | 6/2012 | ........... | G02B 6/0011 |
| WO | 2014/014413 A1 | 1/2014 | | |
| WO | 2015/119094 | 8/2015 | | |
| WO | 2016/048150 A1 | 3/2016 | | |
| WO | 2016/076797 | 5/2016 | | |
| WO | 2017/039535 | 3/2017 | | |

OTHER PUBLICATIONS

Office Action with Search Report issued from the Taiwan Patent Office for related Application No. 106130934 dated Sep. 8, 2020 (15 Pages including Statement of Relevance).
Extended Search Report issued from the European Patent Office for related Application No. 17853548.0 dated Sep. 20, 2019 (10 Pages).

* cited by examiner

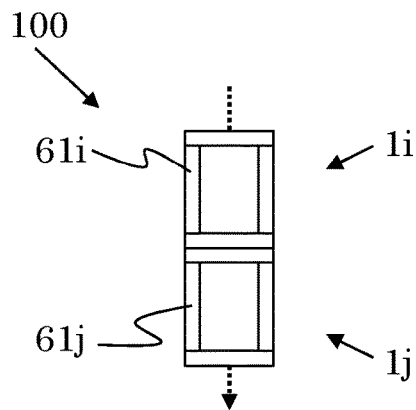
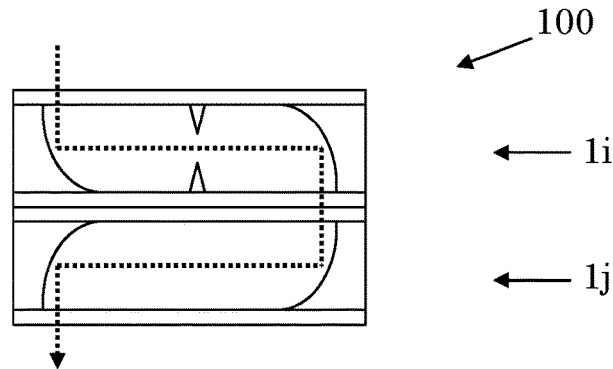
Fig. 13a  Fig. 13b
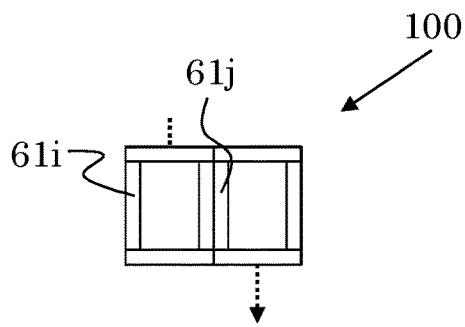
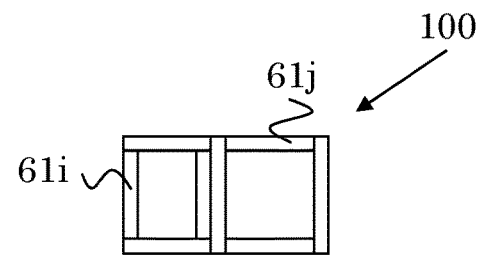
Fig. 14a  Fig. 15
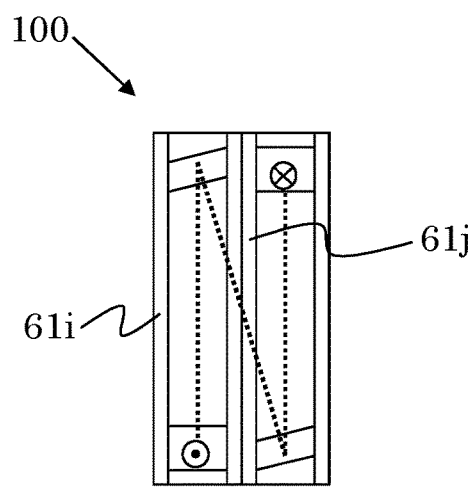
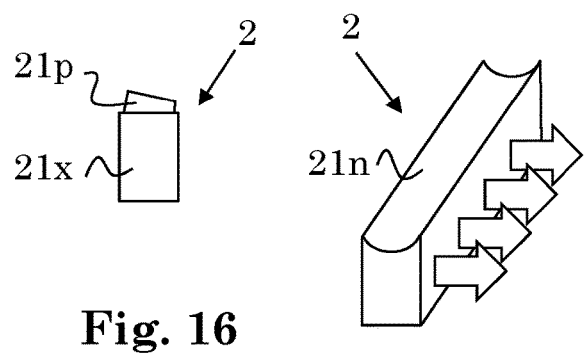
Fig. 14b  Fig. 16
Fig. 17

MINIATURIZED OPTICAL DEVICES, SUCH AS SPECTROMETERS AND SPECTROMETER MODULES, AND THEIR MANUFACTURE

TECHNICAL FIELD

The invention relates to optical devices and also to their manufacture. More particularly, it relates to miniaturized optical devices, e.g., which are spectrometers or which are for use in spectrometers. Due to their miniscule size and/or their large-scale wafer-level-like manufacturability, the optical devices can be suitable for use in electronic devices such as smart phones and other portable computing devices such as portable computers, tablet computers or for use in small-size accessories such as accessories for said electronic devices. The invention also relates to the manufacture of (miniaturized) optical devices taking place, at least in part, in a wafer-level-like fashion.

BACKGROUND OF THE INVENTION

The ongoing trend of miniaturization and of integrating various functionalities such as various sensing capabilities into small-sized devices such as into smart phones or tablet computers or accessories to such devices demands high-accuracy mass production of corresponding devices.

From WO 2016/076797, a method is known for wafer-level-like manufacture of optical light guides. In said method, "prism bars" are produced which have planar reflective faces acting as planar mirrors for beam deflection.

SUMMARY OF THE INVENTION

New manufacturing methods and new optical devices have been invented by the inventors. Corresponding versatile ways of manufacturing optical devices will be herein described which make possible high-accuracy positioning and alignment of parts in wafer-level mass production.

A possible application concerns spectrometers and/or optical modules for use with spectrometers.

An example of an advantage of a version of the invention is to create a way of manufacturing high-precision optical devices.

Another example of an advantage of a version of the invention is to create a way of manufacturing optical devices in high volumes (mass production).

Another example of an advantage of a version of the invention is to make possible to mass-produce miniscule precision spectrometers or optical modules for spectrometers.

Further objects and various advantages emerge from the description and embodiments below.

At least one of these objects can be achieved in some implementations of apparatuses and/or methods described in this disclosure.

We herein describe a method for manufacturing an optical device, wherein the method can include
  a) providing a plurality of bars referred to as initial bars, each initial bar extending along a respective initial-bar direction from a first bar end to a second bar end and having a first side face extending from the first bar end to the second bar end, a first optical component arrangement being present at the first side face;
  b) positioning the initial bars in a row with their respective initial-bar directions aligned parallel to each other and with their respective first side faces facing towards a neighboring one of the initial bars;
  c) fixing the plurality of initial bars with respect to each other in the position achieved in step b) to obtain a bar arrangement.

The method further can include
d0) obtaining bars referred to as prism bars by carrying out at least one of the following steps d), d'), d"):
  d) segmenting the bar arrangement into the prism bars each of which includes a portion of at least two different ones of the plurality of initial bars, by conducting a plurality of cuts through the bar arrangement (wherein the cuts can be, e.g., parallel cuts);
  d') segmenting the bar arrangement into the prism bars by separating the bar arrangement into sections along cut lines, wherein the cut lines are at an angle with the initial-bar directions;
  d") segmenting the bar arrangement into the prism bars by separating the bar arrangement into sections by creating cut faces which are at an angle with respect to the initial-bar directions.

The segmenting the bar arrangement into the prism bars can furthermore include
  dx) dividing the first optical component arrangement for obtaining a plurality of passive optical components, wherein each of the prism bars includes one or more of the passive optical components which include a first reflective face each, wherein the first reflective faces can be of non-planar shape.

The method furthermore include
  e) segmenting the prism bars into parts.

The passive optical components can be, accordingly, different from planar mirrors. This makes the method very versatile. More details regarding the passive optical components are given below.

However, the non-planarity of the first reflective faces is an option. This holds in particular in the case of stacking a first prism bar onto a second prism bar (cf. below for details).

In some embodiments, each of the parts is included in one of the optical devices.

In some embodiments, each of the parts includes one of the optical devices.

In some embodiments, the cut lines mentioned in steps d') and d") and the cuts mentioned in step d), respectively, are at an angle of between 20° and 75° with respect to the initial bar directions, e.g., they can be at an angle of 45° with respect to the initial bar directions.

Despite the name "prism bars", these objects do not need to include prisms, as will become clear below.

In a particular view, the bar arrangement can be understood as a wafer which is produced in a special way, namely by means of the arranging the multitude of initial bars. A very high degree of accuracy of in the positioning and alignment of slanted objects and/or of reflective faces can be achieved in the described way of producing the prism bars.

For example, step c) (producing the bar arrangement) can include attaching the initial bars to a first substrate, e.g., a plate-shaped first substrate. A first outer side panel of a manufactured optical device (which will be described further below) can be a section of such a first substrate, e.g., as obtained in step d0) by segmenting the bar arrangement. Moreover, producing the bar arrangement can include sandwiching the initial bars between a first substrate and a third substrate, e.g., which can be plate-shaped. A first outer side panel of a manufactured optical device (which will be described further below) can be a section of such a first substrate, e.g., as obtained in step d0) by segmenting the bar arrangement. And similarly, a third outer side panel of a manufactured optical device (which will be described further below) can be a section of such a third substrate, e.g., as obtained in step d0) by segmenting the bar arrangement. This is similar to what is described in said WO 2016/076797, in which further details regarding the substrates and the bar arrangements can be found.

In some embodiments, the first substrate includes a plurality of protrusions protruding between neighboring initial bars in the bar arrangement.

Such protrusions can function as baffles in the optical device. E.g., such baffles can improve spectrometer performance by preventing that stray light or light which is not sufficiently collimated impinges on a diffractive element, e.g., on a grating, of the optical device. It is noted that the provision of the protrusions implies only a slight increase of the complexity of the manufacture and means no increase of the size of the optical device.

Optionally, also the third substrate (if present) can have such protrusions.

In some embodiments, the first substrate includes a plurality of openings adjoining open space present between neighboring initial bars in the bar arrangement. Such openings can function as entrance openings (or exit areas), e.g., entrance slits (or exit openings), for light entering (or exiting) a respective the optical device. For example, in case of a stacked optical device (compound optical device; cf. below for details), such an opening can let light travel from the first to the second optical device. In case the first substrate is (prevailingly) made of a non-transparent material, the opening can function, e.g., as an aperture or as an opening of a baffle. If the first substrate is (prevailingly) transparent, reflections at the first substrate can be avoided by providing the opening. It is noted that the provision of openings implies only a slight increase of the complexity of the manufacture and means no increase of the size of the optical device.

Optionally, also the third substrate (if present) can have such openings.

An alternative to the provision of openings is the provision of material transparent portions (similarly to the material transparent portion described below for the second and/or fourth substrate).

The protrusions and the transparent portions (openings or material transparent portions) of the substrates can be arranged along a light path defined by the optical device.

There are various ways of obtaining the initial bars.

In some embodiments, producing the initial bars includes providing a plate and conducting a plurality of cuts through the plate which run parallel to each other and parallel to the initial-bar directions. The plate can define plate plane. The cuts can create cut faces which are aligned perpendicularly to the plate plane.

A plurality of first optical component arrangements (such as one for each initial bar to be produced) can be present, e.g., at an upper side of the plate which is aligned parallel to the plate plane.

Producing the first optical component arrangements can, in any of the embodiments, include a coating step in order to provide reflectivity of the passive optical components. E.g., a metallic or an dielectric coatings can be applied.

However, a reflectivity of the first optical component arrangement (and, if present, optionally also a reflectivity of the further optical component arrangement) can, in some embodiments, be due to total internal reflection (TIR). In this case, a material included in the respective optical component arrangement has a relatively high index of refraction, e.g., an index of refraction of at least 1.3, or of at least 1.4, or of at least 1.5. In the manufactured optical devices, the passive optical components can be interfacing a gas such as, e.g., air. This way, relatively low refractive indices can be sufficient for TIR.

In some embodiments, the first optical component arrangements are present at the plate already at the time of conducting the cuts. In many cases, this can be more efficient than applying the first optical component arrangements after conducting the cuts.

In some embodiments, the first optical component arrangements are shaped at the same time as the plate. This can be accomplished, e.g., using a replication process, such as an injection molding process.

In some embodiments, the first optical component arrangements are shaped independently from the plate.

The method can include, e.g., attaching the first optical component arrangements (with or without coating) to the plate, or reshaping the plate, e.g., plus a subsequent coating step.

E.g., the first optical component arrangements can be produced on the plate using a replication process such as using an embossing process, e.g., with a subsequent coating step. Or the first optical component arrangements and its constituents, respectively, are pre-fabricated (with or without coating) and then attached to the plate, e.g., using pick-and place, optionally with a subsequent coating step. Or producing the first optical component arrangements includes removing material from the plate such as by micro-machining or laser ablation, e.g., with a subsequent coating step.

In some embodiments, producing an initial bar includes providing a precursor bar and, analogously to any of the ways described above for the plate, e.g., attaching the first optical component arrangement (with or without coating) to the precursor bar, or reshaping the precursor bar, e.g., plus a subsequent coating step.

In some embodiments, however, the first optical component arrangements are shaped at the same time as the precursor bar. This can be accomplished, e.g., using a replication process, such as an injection molding process. A subsequent coating process can be carried out.

The initial bars can be congeneric initial bars.

In some embodiments, in step b), the initial bars are positioned in a distance to each other.

The positioning mentioned in step b) above can be an equidistant positioning of the initial bars.

In some embodiments, each of the initial bars has a first, a second, a third and a fourth side faces, each extending from the first to the second bar end, the first and third side faces being planar faces aligned parallel to each other, the second and fourth side faces being separated from each other by and arranged between the first and the third side faces.

In some embodiments, the first optical component arrangement includes a plurality of distinct passive optical components, e.g., an array of passive optical components.

In some embodiments, the first optical component arrangement includes a continuous optical structure which is separated into a plurality of the passive optical components by the segmenting of the bar arrangement into the prism bars. E.g., a continuous (and long) diffraction grating or a single (and long) curved mirror is present (as the first optical component arrangement) at each of the initial bars of the bar arrangement, and the segmenting of the bar arrangement into the prism bars effects that said diffraction grating and said curved mirror, respectively, is divided into a plurality of distinct (and smaller) diffraction gratings and curved mirrors, respectively, as the passive optical components.

In some embodiments, each of the first reflective faces has a curved shape. This way, focusing functions can be implemented in the optical device.

In some embodiments, each of the first reflective faces includes a diffractive optical structure. This way, a wavelength-dependent deflection of light propagating in the optical device can be achieved, as is useful in spectrometers.

In some embodiments, each of the passive optical components including the first reflective face is a diffractive passive optical component.

In some embodiments, each of the passive optical components including the first reflective face includes, e.g., is a curved mirror.

In some embodiments, each of the passive optical components including the first reflective face is a diffraction grating, e.g., a curved diffraction grating.

As will be appreciated, in some embodiments, the initial bar include a third side face extending from the first bar end to the second bar end, a further optical component arrangement can be present at the third side face. The third side face can be at a distance from the first side face. E.g., the first and the third side faces can be non-adjacent to each other. They can be, e.g., parallel to each other and/or mutually opposite faces of the respective initial bar.

The further optical component arrangement can be produced in any of the ways described for the first optical component arrangement. It can, however, be different and result in different passive optical components. E.g., from segmenting the bar arrangement, the first optical component arrangement can be divided into distinct diffraction gratings, while the further optical component arrangement can be divided into distinct curved mirrors.

In some embodiments, the method includes, before step e), attaching the prism bars to one or more further substrates (such as to a second and a fourth substrate), wherein the segmenting mentioned in step e) includes segmenting the one or more further substrates. For example, each of the so-obtained parts includes a section of the one or more further substrates, e.g., a section of the second and a section of the fourth substrate.

A second outer side panel of a manufactured optical device (which will be described further below) can be a section of such a further substrate, e.g., a section of a second substrate, as obtained in step d0) by segmenting the bar arrangement. And similarly, a fourth outer side panel of a manufactured optical device (which will be described further below) can be a section of such a further substrate, e.g., a section of a fourth substrate, as obtained in step d0) by segmenting the bar arrangement. The one or more further substrates, e.g., second and fourth substrates, can be plate-shaped.

The further substrate is analogous to what is described in the above-mentioned WO 2016/076797 as "optics wafer". Further details concerning the further substrates can be found in said WO 2016/076797. Said WO 2016/076797 can in general be referred to for further details regarding the manufacturing method and regarding the optical devices.

Similarly to what has been described above for the first and/or third substrates, also the second and/or fourth substrates can have protrusions and/or transparent portions (which can be, e.g., transparent material portions or openings). More specifically:

In some embodiments, the second substrate includes a plurality of protrusions protruding between sections of initial bars in the prism bar. More specifically, the protrusions can protrude between sections of initial bars which were neighboring initial bars in the bar arrangement.

Such protrusions can function as baffles in the optical devices. E.g., such baffles can improve spectrometer performance by preventing that stray light or light which is not sufficiently collimated impinges on a diffractive element, e.g., on a grating, of the optical device. It is noted that the provision of the protrusions implies only a slight increase of the complexity of the manufacture and means no increase of the size of the optical device.

Optionally, also the fourth substrate (if present) can have such protrusions.

In some embodiments, the second substrate includes a plurality of openings adjoining open space present between neighboring sections of initial bars. More specifically, the openings can adjoin the open space present between sections of initial bars which were neighboring initial bars in the bar arrangement.

Such openings can function as entrance openings, e.g., entrance slits, for light entering a respective the optical device. For example, such an opening can function as an entrance slit of a spectrometer including the optical device.

Also the example given above for the first substrate in the case of a stacked (compound) optical device is a valid example for the instant second substrate.

Optionally, also the fourth substrate (if present) can have such openings.

An alternative to the provision of openings is the provision of material transparent portions, e.g., when the openings function as entrance slits.

As has been described above, the material transparent portions can originate from a respective substrate, such as when producing the bar arrangement (with the first and optionally the third substrate) and when producing the prism bar arrangement (with the second and optionally with the fourth substrate), respectively. (Prism bar arrangements are described below.)

In some embodiments, the second substrate includes a plurality of further passive optical components. Those can be arranged between sections of initial bars in the prism bar and/or outside the prism bars. E.g., the further passive optical components can protrude between sections of initial bars which were neighboring initial bars in the bar arrangement.

Such further passive optical components can be, e.g., lens elements, such as lens elements functioning as collimating lenses in the optical devices. E.g., a collimating lens adjoining an entrance slit can be provided. This can originate from a substrate, e.g., from the second substrate, which includes a plurality of entrance slits adjoining a collimating lens each. It is noted that the provision of the combined entrance slit and collimator implies only a slight increase of the complexity of the manufacture and means no increase or only little increase (in the case of outside collimating lenses) of the size of the optical device.

Optionally, also the fourth substrate (if present) can have such further passive optical components.

In some embodiments, the method includes stacking a first prism bar onto a second prism bar. This can result in particularly elaborate optical device and/or in optical devices designed to define a relatively long or complicated light path.

The first and second prism bars can be nominally identical prism bars or, alternatively, nominally different prism bars, such as prism bars with different passive optical components and/or differently arranged passive optical components.

Accordingly, the first and second prism bars can be obtained from nominally (or even factually) identical bar arrangements, or from nominally different bar arrangements.

The prism bars can each have a prism bar direction. The prism bar direction can correspond to the direction of the cuts in step d) and to the direction of the cut lines in step d') and to the direction of a projection of the initial bar direction into a plane containing the cut faces in step d"), respectively. The prism bar direction corresponds, in a manufactured optical device to a primary direction of the optical device, which can point from the first to the second member (and vice versa) and/or be parallel to the first and second outer side panels.

The stacking of the first and second prism bars can be accomplished with their respective prism bar directions aligned parallel to each other. We note that the term "direction" as used in the present description is not a vectorial magnitude. Accordingly, "directions" as used in the present description cannot be antiparallel.

In some embodiments, at the time of stacking the first prism bar onto the second prism bar, a plurality of first prism bars is arranged with their respective prism bar directions aligned parallel to each other. They can be arranged in one and the same plane. E.g., the first prism bars can be fixed to each other to form a first prism bar arrangement. This can make possible a high-accuracy mass production.

Furthermore, also the second prism bars can be arranged in such a way. Accordingly, a first prism bar arrangement and a second prism bar arrangement can be stacked upon each other. Step e) in this case can be accomplished by segmenting a stack including the first prism bar arrangement stacked upon second prism bar arrangement. This way, high-accuracy mass production can be enabled.

There are different ways of stacking. Resulting optical devices are described below.

The described optical devices can be, e.g., spectrometers or optical modules for use in a spectrometer. The optical modules can include a diffraction grating as a passive optical component. And they can include a focusing element which can be identical with the grating (curved grating) or can be an additional optical element such as a curved mirror.

Each of the manufactured optical devices can define at least one light path for light entering the optical device, e.g., through an entrance slit, being reflected by the grating and being subsequently focused. All this within the optical device, wherein, of course, further deflections (e.g., focusing or specular reflections) can take place in the optical device, such as by further passive optical components of the optical device.

An entrance slit of an optical device can be a transparent portion in the second outer side panel or in another one of the outer side panels. Such entrance slits can include transparent material surrounded by non-transparent material, or can include an opening surrounded by non-transparent material.

In some embodiments, the light exits the optical device, e.g., to be detected by an external detector. In some embodiments, however, e.g., in case the optical device is a spectrometer, the optical device includes a detector for detecting light diffracted by a grating of the optical device.

In analogy to what is disclosed in above-mentioned WO 2016/076797, it is possible, already without stacking prism bars, to manufacture by the described method at least two different types of parts or optical devices, depending on how the segmenting of the prism bars in step e) is accomplished. By selecting the location of cut lines at which the segmentation mentioned in step e) is accomplished, it can be defined whether type I and/or type II optical devices are produced. E.g., in case of type I parts, light propagation within the part obtained in step e) between two passive optical components of the part (such as between two reflective passive optical components) can take place within a section of one of the initial bars; and in case of type II, light propagation within the part obtained in step e) between two passive optical components of the part (such as between two reflective passive optical components) can take place in vacuum or in a gas present between sections of two different ones of the initial bars, such as between initial bars which were, in the bar arrangement, neighboring initial bars. Furthermore, also type-III parts can be produced by the described method in which case further bars are positioned between initial bars in the bar arrangement (please refer to WO 2016/076797 for more details).

Throughout the present patent application, prevailingly type-II-like parts and optical devices, respectively, are described, for brevity. The reader, however, will be able to transfer, in the light if the present description, the described features and embodiments to the case of type-II-like parts and optical devices.

When prism bars are stacked and when corresponding optical devices are produced, respectively, various types of parts can be produced, depending on the mutual positioning of the first prism bars to the second prism bars stacked upon each other and depending on how the segmenting of the prism bars in step e) is accomplished. E.g., type-I-like or type-II-like or mixed (type-I-and-type-II-like) parts can be produced.

The invention can also relate to optical devices. Those optical devices can be, e.g., optical devices manufactured according to the method described herein.

The optical device can include
an outer side panel referred to as first outer side panel;
a first member including a first base face and a second base face and, in addition, a first reflective face; and, in addition,
a second reflective face, the second reflective face facing the first reflective face.

Therein, the first base face is aligned parallel to the first outer side panel and attached thereto, and at least one of the first and second reflective faces can be of non-planar shape.

The first and second base faces are aligned parallel to each other.

The non-planar shape of the first and/or second reflective faces is an option. This holds in particular in the case of stacking a first prism bar onto a second prism bar (cf. above for details) and to compound optical devices (cf. below), respectively.

In some embodiments, the optical device includes
a second member including a first further base face and a second further base face, and, in addition, the second reflective face;
wherein the first further base face is aligned parallel to the first outer side panel and attached thereto.

The first and second further base faces can be aligned parallel to each other

Such optical devices with a second member can include (and in instances be), e.g., parts of type II.

Alternatively, the second reflective face can be included in the first member, such as wherein the first and second reflective faces are located at opposite ends of the part and of the optical device, respectively. Such optical devices can include (and in instances be), e.g., parts of type I.

In some embodiments, the optical device includes another outer side panel, referred to as third outer side panel, which is aligned parallel to the first outer side panel;

wherein the second base face is aligned parallel to the third outer side panel and attached thereto.

Such a double-sided fixation of the members can provide a particularly good stability and can originate, in the described manufacturing method, from bar arrangements including a first and a third substrate.

In some embodiments, the first and second members are sandwiched between the first and third outer side panels.

When the optical device includes the above-mentioned second member, the second further base face can be aligned parallel to the third outer side panel and be attached thereto.

In some embodiments, the optical device includes a diffractive element which includes the first reflective face or the second reflective surface. E.g., the optical devices can include a diffraction grating, e.g., a curved one.

In some embodiments, the optical device includes a focusing element which includes the first reflective face or the second reflective surface, e.g., a curved mirror.

Alternatively or in addition, the first reflective face or the second reflective surface can be included in another passive optical component, such as in a prism.

In some embodiments, the first member includes a first passive optical component, and the second member includes a second passive optical component.

In case of type-I-like parts or optical devices, two passive optical components can be present at opposite ends of the first member.

In some embodiments, the optical device includes at least one of (and, in instances, both of)
  a diffractive element including the first reflective face or the second reflective surface;
  a focusing element including the first reflective face or the second reflective surface.

In some embodiments, the optical device defines a light path for light entering the optical device, wherein light propagating along said light path is diffracted by the diffractive element and focused, e.g., subsequently focused, by the focusing element.

In some embodiments, the optical device includes, in addition, another outer side panel, referred to as second outer side panel, which is aligned perpendicularly to the first outer side panel. The first member and, if present, the second member, can be attached to the second outer side panel, namely at respective further faces which interconnect the respective first and second base faces.

Analogously, a fourth outer side panel can be provided, such that the first member (and, if present, the second member) is sandwiched between the second and fourth outer side panels. And also the first outer side panel (and, if present, the third outer side panel) can be sandwiched between the second and fourth outer side panels. This way, the optical device can be very stable and can be hermetically closed, optionally having one or more openings, which however can be, e.g., openings interfacing two neighboring optical devices of a compound optical device.

The second and the fourth outer side panels can be aligned mutually parallel.

In some embodiments, the second outer side panel includes a baffle. Such a baffle can have the same properties as described for corresponding protrusions at substrates described herein, e.g., as described for those at the second substrate. And alternatively or in addition, the fourth outer side panel can analogously include a baffle.

Similarly, also the first and/or the third outer side panel can include a baffle.

Such baffles can be embodied as protrusions protruding from the respective outer side panel between the first and second members.

By the baffle(s), stray light in the optical device can be suppressed and/or light propagation along undesired paths can be reduced.

In some embodiments, the second outer side panel includes a transparent portion. In some embodiments, the transparent portion is a material transparent portion; in other embodiments, the transparent portion is an opening.

Such a transparent portion can have the same properties as described for corresponding transparent portions, e.g., openings, in substrates described herein (cf. below), such as those in the second substrate. And alternatively or in addition, the fourth outer side panel can analogously include a transparent portion.

Similarly, also the first and/or the third outer side panel can include a transparent portion.

The transparent portion can be provided for letting light enter the optical device or for letting light exit the optical device.

Such a transparent portion can be, e.g., function as entrance slits (for light entering the optical device) or as exit areas (for light exiting the optical device). They can be particularly valuable for achieving a well-defined light propagation in compound optical devices and/or for defining a light path in a compound optical device which involves light propagation in the first and in the second optical device of the compound optical device.

In some embodiments, the optical device includes an entrance slit at the beginning of the light path. The entrance slit can be included in one of the side panels, e.g., in the second or in the fourth outer side panel.

In some embodiments, the optical device includes a further passive optical component, e.g., a lens element, at one of its outer side panels.

In some embodiments, the second outer side panel includes a further passive optical component. Such a further passive optical components can have the same properties as described for corresponding ones at substrates described herein, such as those at the second substrate. And alternatively or in addition, the fourth outer side panel can analogously include a further passive optical component.

Similarly, also the first and/or the third outer side panel can include a further passive optical component.

Such a further passive optical component can be located in a cavity enclosed by the first, second, third and fourth outer side panels and the first and second members.

The further passive optical component can protrude from the respective outer side panel between the first and second members.

The further passive optical component can be a diffractive or a refractive or a diffractive-and-refractive element, e.g., lens element.

The further passive optical component can be a transmissive passive optical component, e.g., produced using a replication technique, such as injection molding or embossing.

The further passive optical component can be arranged to be traversed by light travelling in the optical device along the light path.

In some embodiments, the optical device includes a collimating element, e.g., as a collimating element situated, along the light path, between the entrance slit and the diffractive element. It can contribute to effecting that the diffractive element is illuminated by collimated, by parallelized light.

In some embodiments, the optical device defines an optical path in which light enters the optical device through an entrance slit, is thereafter collimated by one or more collimating elements each of which can be transmissive or reflective, thereafter optionally traverses a baffle, thereafter is diffracted by a diffractive element, such as by a reflective diffraction grating, after which the diffracted light is focused by a (reflective or transmissive) focusing element such as a curved mirror, wherein the focusing can, alternatively or in addition, be accomplished by the diffractive element. The focused light exits the optical device, e.g., in order to be detected by an external detector, or, alternatively, the focused light is detected by a detector which is internal to the optical device.

In the described way, a miniscule module for a spectrometer and a miniscule spectrometer can be realized which is manufacturable in very high numbers and, nevertheless, in very high optical precision.

In some embodiments, the shape of the first base face is different from the shape of the second base face. This can be the case, e.g., if a passive optical component included in the first member is correspondingly shaped. This can be useful, e.g., in specific compound optical devices.

If present, the same holds analogously also for the second member.

In some embodiments, the shape of at least one face of the first member interconnecting the respective first and second base faces is different from planar, e.g., the first reflective face.

If present, the same holds analogously also for the second member.

Accordingly, in some embodiments, the first member (and the second as well) can have shape deviating from a prism shape. Nevertheless—and in view of the above-cited publication WO 2016/076797—the bars including a plurality of the first and/or second members are referred to as prism bars.

A compound optical device includes a first and a second optical device of the described kind which are fixed to one another. Light entering the compound optical device travels inside the first optical device and inside the second optical device. This can make possible the design of optical devices of relatively high complexity and/or with relatively many passive optical components and/or of optical devices by which a relatively long light path is defined.

The first and the second optical device can be stacked upon each other.

In some embodiments, the first outer side panel of the first optical device is aligned parallel to the first outer side panel of the second optical device.

E.g., the respective first outer side panels of the first and second optical devices can be arranged in one and the same plane, e.g., the second outer side panel of the first optical device and the second or the fourth outer side panel of the second optical device being attached to each other. This way, e.g., compound optical devices can be realized in which light propagation takes place predominantly within a plane parallel to the first outer side panels of the first and second optical devices.

Or, alternatively, the respective first outer side panels of the first and second optical devices can be arranged in different (but parallel) planes which are located at a distance to each other. E.g., the first outer side panel of the first optical device can be attached to the first (or the third) outer side panel of the second optical device. This way, at least a portion of the light path defined by the compound optical device is at an angle with a plane parallel to the first outer side panels of the first and second devices, i.e. has a component perpendicular to the plane parallel to the first outer side panels of the first and second devices.

In some embodiments, the first outer side panel of the first optical device is aligned perpendicularly to the first outer side panel of the second optical device. E.g., the first outer side panel of the first optical device can be attached to the second (or to the fourth) outer side panel of the second optical device. This can facilitate creating very compact compound optical devices, e.g., with light paths meandering between optical devices which are arranged in a fashion different from an arrangement in which all optical devices of the compound optical device are arranged in one and the same plane.

Of course, the optical device can inherit any feature arising from one of the described manufacturing methods and vice versa.

Further embodiments and advantages emerge from the following description and the enclosed figures and from the dependent claims.

BRIEF DESCRIPTION OF THE DRAWINGS

Below, the invention is described in more detail by means of examples and the included drawings. In the drawings, same reference numerals refer to same or analogous elements. The figures show schematically:

FIG. 13a a schematical rear view of a compound optical device;

FIG. 13b a schematical cross-sectional side view of the compound optical device of FIG. 13a;

FIG. 14a a schematical rear view of a compound optical device;

FIG. 14b a schematical cross-sectional top view of the compound optical device of FIG. 14a;

FIG. 15 a schematical rear view of a compound optical device;

FIG. 16 a schematical rear view of an initial bar with passive optical components on a precursor bar;

FIG. 17 a schematical perspective view of an initial bar with a continuous optical structure.

The described embodiments are meant as examples or for clarifying the invention and shall not limit the invention.

DETAILED DESCRIPTION OF THE INVENTION

In the following, ways of manufacturing optical devices are explained. In some of the Figures, small coordinate systems are symbolized for explaining the orientation of the illustrated parts. Therein, x, y, z designate coordinates related to the initial bars, while x', y', z' designate coordinates related to prism bars.

The manufacturing can be accomplished on wafer level, thus making possible to manufacture high numbers of high precision parts within a relatively small period of time and/or by means of a relatively low number of processing steps.

Figure 1A:
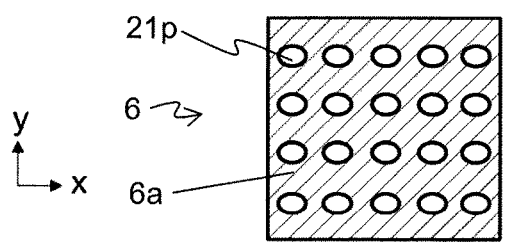
FIGS. 1a-1c schematical illustrations in a top view of a manufacture of initial bars.
Figure 1B:
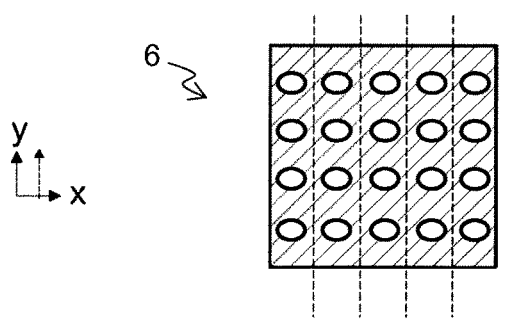
Figure 1C:
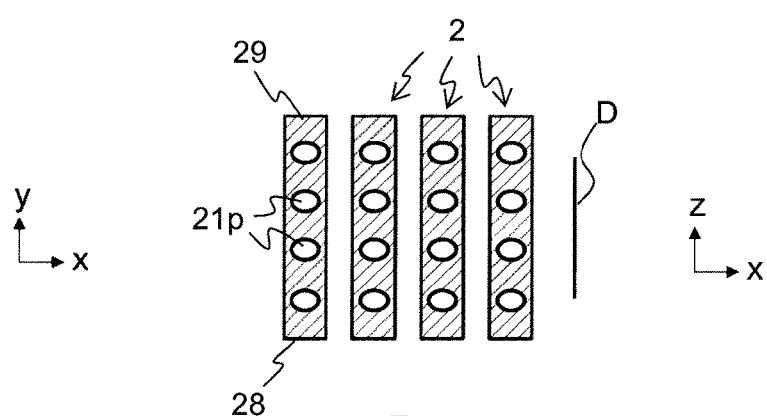

FIGS. 1a-1c are schematical illustrations in a top view of a manufacture of initial bars 2.

Figure 2A:
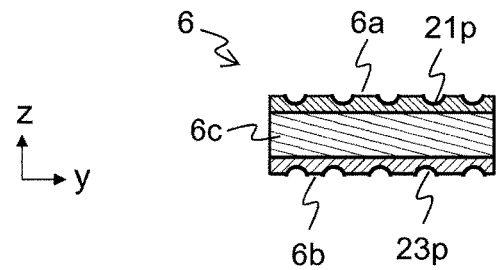
FIGS. 2a-2c schematical illustrations in a cross-sectional view of a manufacture of initial bars.
Figure 2B:
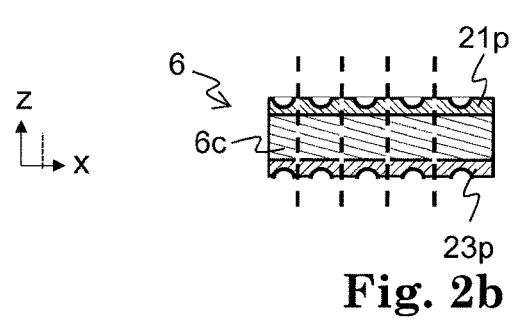
Figure 2C:
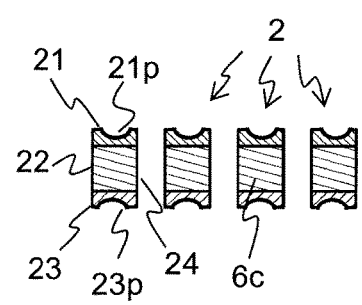

FIGS. 2a-2c are schematical illustrations in a cross-sectional view of the manufacture of initial bars 2.

FIGS. 1a, 2a illustrate a plate 6 having an upper face 6a and a lower face 6b, wherein first passive optical components 21p are present at face 6a, and second passive optical components 23p are present at face 6b. The passive optical components 21p, 23p can be reflective passive optical components. The passive optical components can be, e.g., produced using a replication technique, e.g., with a subsequent coating step to provide reflectivity. Between replication material from which the passive optical components are formed, a core 6c can be present.

The passive optical components can be, e.g., curved mirrors or gratings, e.g., curved gratings.

In FIGS. 1b, 2b, separation lines are indicated by dashed lines, which are also symbolized in the coordinate systems. By separating plate 6 along these lines, a plurality of initial bars 2 is obtained, as illustrated in FIGS. 1c, 2c.

Each initial bar 2 has a first bar end 28 and a second bar end 29 and four side faces 21, 22, 23, 24, wherein a plurality of passive optical components 21p is present at first side face 21, and a plurality of passive optical components 23p is present at third side face 23.

The initial bars are, in some embodiments, congeneric. But this does not need to be the case.

Furthermore, passive optical components 21p and 23p do not need to be congeneric passive optical components; they do not even have to be produced and placed, respectively, in the same way.

And still furthermore, not all passive optical components 21p need to be congeneric. E.g., two or more different (non-congeneric) passive optical components can be present at the first side face 21. The same can apply to passive optical components 23p.

In order to produce a bar arrangement 20 (cf., e.g., FIGS. 5, 6), the initial bars 2 have to be positioned suitably. Therein, side faces 21, 23 of the initial bars 2 at which passive optical components are present face each other. I.e. with respect to the mutual orientation the initial bars have during separation of plate 6 (cf. FIGS. 1c, 2c), each initial bar is rotated by 90° about the y axis corresponding to an initial-bar direction D, cf. FIG. 1c.

Figure 3A:
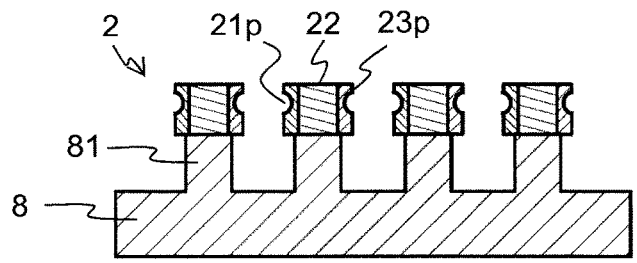
FIGS. 3a-3c schematical illustrations in a cross-sectional view of a positioning of initial bars using a jig.
Figure 3B:
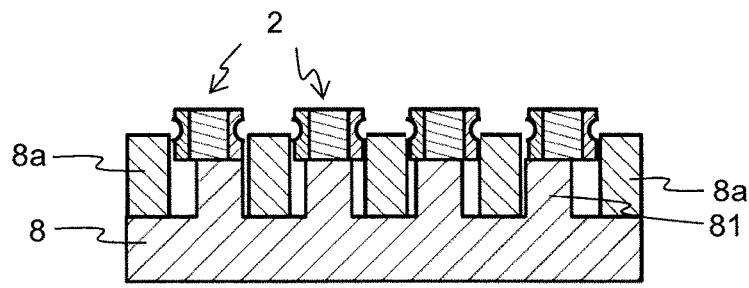
Figure 3C:
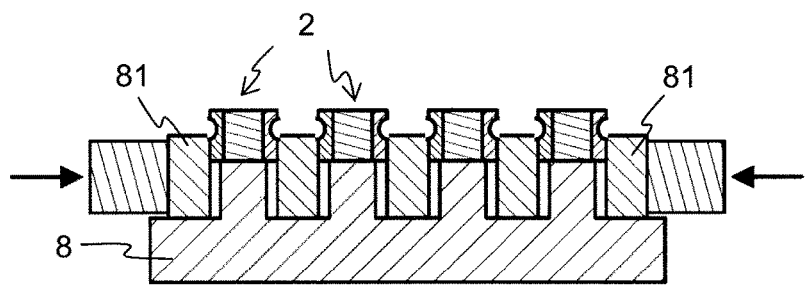

One way of positioning the initial bars 2 is to use a jig 8 as illustrated in FIGS. 3a-3c.

FIGS. 3a-3c are schematical illustrations in a cross-sectional view of a positioning of initial bars 2 using a jig 8.

Jig 8 has a plurality of protrusions 81 on which an initial bar 2 can be positioned each. After attaching initial bars 2 to protrusions 81, spacers 8a are inserted between the initial bars 2 (cf. FIG. 3b). The spacers 8a can also be considered shims.

By application of a force, e.g., by a spring or by applying a vacuum, a suitable, e.g., equidistant, spacing of the initial bars 2 is achieved, cf. FIG. 3c.

Figure 4:
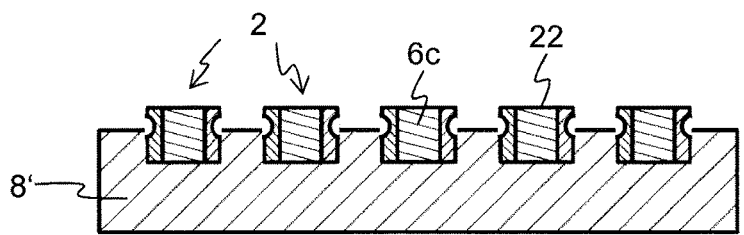
FIG. 4 a schematical illustration in a cross-sectional view of a positioning of initial bars using another jig.

Also other jigs can, alternatively, be used, e.g., jig 8' as illustrated in FIG. 4.

FIG. 4 is a schematical illustration in a cross-sectional view of a positioning of initial bars 2 using another jig 8'.

Jig 8' has grooves into which initial bars 2 can be inserted, thus ensuring a precise mutual alignment of the initial bars 2.

A jig is used for the positioning only and will be removed later.

Positioning the initial bars alone or together with further bars (an option which is generally described in above-cited WO 2016/076797, e.g., FIGS. 27-37 therein) without using a jig is possible, too, e.g., by simply pushing the bars against each other, each one against its one or two neighboring ones (cf., e.g., FIGS. 27a, 28a in WO 2016/076797).

Figure 5:
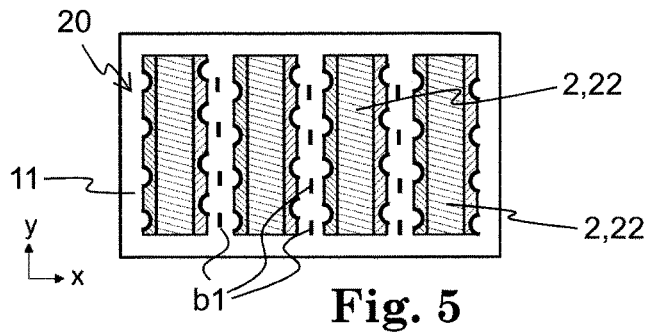
FIG. 5 a schematical illustration in a top view of a manufacture of a bar arrangement.
Figure 6:
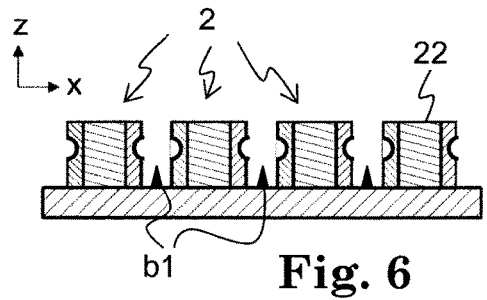
FIG. 6 a schematical illustration in a cross-sectional view of the manufacture of a bar arrangement illustrated in FIG. 11b.

FIG. 5 is a schematical illustration in a top view of a manufacture of a bar arrangement 20, e.g., based on bars positioned as described above. FIG. 6 is a schematical illustration in a cross-sectional view of the manufacture of a bar arrangement illustrated in FIG. 5.

In FIGS. 5, 6, the initial bars are positioned as required for the desired bar arrangement. A jig possibly used for the positioning of the initial bars 2 is not illustrated here. The initial bars 2 can be fixed relative to each other by attaching one or two substrates 11, 12 to the bar arrangement 20. After attachment to a first substrate 11, a jig, if applied before, can be removed from the bar arrangement. However, the positioned initial bars as illustrated, e.g., in FIGS. 5, 6, but without a substrate can represent a bar arrangement, too.

FIGS. 5, 6 illustrate attaching a first substrate 11 to bar arrangement 20. Similarly, a third substrate 13 can be attached to bar arrangement 20, cf. FIGS. 7, 8.

Figure 7:
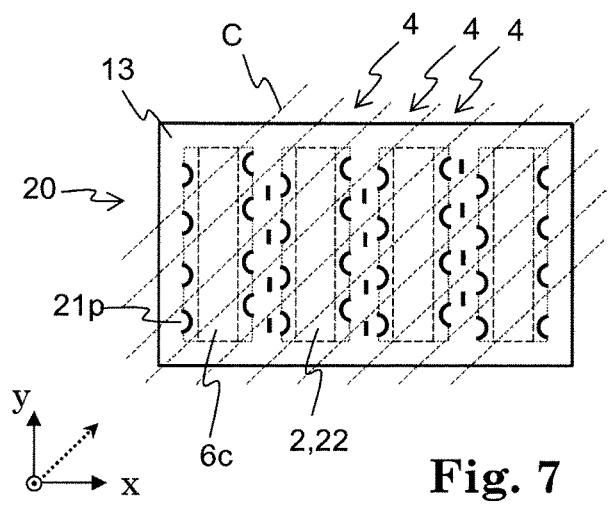
FIG. 7 a schematical illustration in a top view of a manufacture of prism bars from the bar arrangement of FIGS. 11c, 12c.
Figure 8:
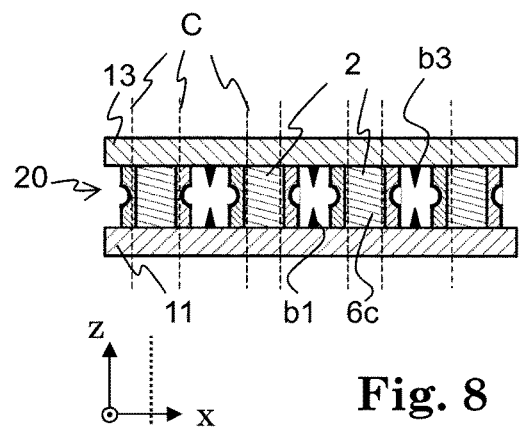
FIG. 8 a schematical illustration in a cross-sectional view of the manufacture of prism bars illustrated in FIG. 13.

FIG. 7 is a schematical illustration in a top view of a manufacture of prism bars 4 from the bar arrangement 20; and FIG. 8 is a schematical illustration in a cross-sectional view of the manufacture of prism bars 4 illustrated in FIG. 7.

Substrates 11, 13 are illustrated to include optional protrusions which function as baffles b1, b3.

In FIGS. 7, 8, the initial bars 2 are sandwiched between first and second substrates 11, 13. A wafer stack is obtained in which the initial bars 2 are positioned with respect to each other with high precision.

In a next step, the obtained wafer stack is separated into bars referred to as prism bars. Therein, cut lines C of the separation are at an angle with the initial-bar lines D, e.g., at an angle of 45°, as illustrated.

Figure 9:
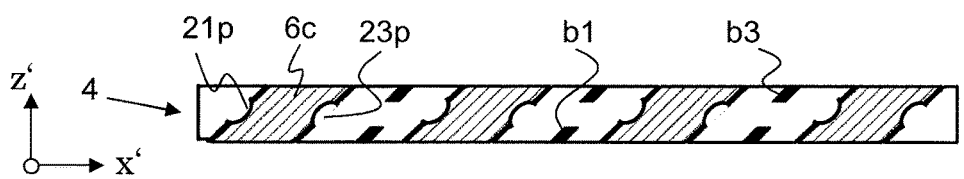
FIG. 9 a schematical cross-sectional view of a prism bar.

FIG. 9 is a schematical cross-sectional view of a prism bar 4, as obtained according to FIGS. 7, 8.

In the coordinate system of the prism bar 4, x' is a coordinate along the extension of the prism bar 4 ("prism bar direction")—which runs somewhere (depending on the cutting angle) between the x and y coordinates of the initial bar coordinate system. It corresponds, in the produced optical device to a primary direction of the produced part or optical device. And z' is a height coordinate of the prism bar 4—which corresponds to the opposite direction of the y coordinate.

Figure 10:
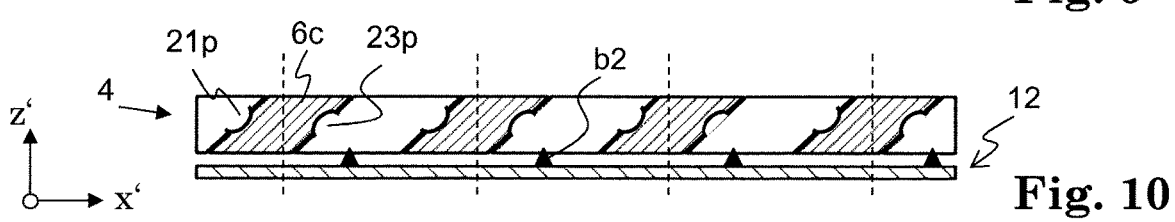
FIG. 10 a schematical illustration in a cross-sectional view of an attaching of the prism bar of FIG. 17 to a second substrate with baffles for manufacturing a type II-like optical device.

FIG. 10 is a schematical illustration in a cross-sectional view of an attaching of the prism bar 4 of FIG. 9 to a second substrate 12 for manufacturing a type II-like optical device. Second substrate 12—which can also be considered a "further substrate"—includes a plurality of optional protrusions. Those protrusions can function as baffles b2.

It is possible to position a plurality of prism bars 4 on such a second substrate 12, e.g., using pick-and-place. However, it is possible to form a prism bar arrangement from a plurality of prism bars, by mutually aligning prism bars 4 and fixing them relative to each other, e.g., similarly to what is described for the formation of an (initial) bar arrangement, e.g., using a jig.

The dashed lines indicate where separation of the prism bars takes place, so as to obtain parts which are type-II-like optical devices. For type-I-like optical devices, the separation would take place, e.g., in the middle between the dashed lines.

Opposite to second substrate 12, a fourth substrate can be attached to the prism bars and to the prism bar arrangement, respectively, such that these are sandwiched between the second and the fourth substrate.

Figure 11:
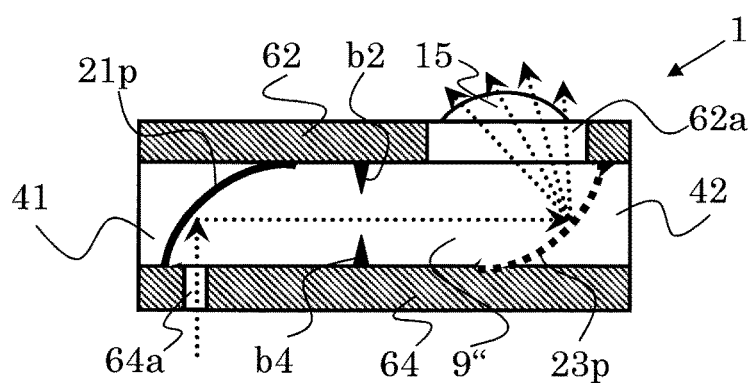
FIG. 11 a schematical cross-sectional view of a type II-like optical device constituting a module for a spectrometer.

FIG. 11 is a schematical cross-sectional view of an optical device of type II constituting a module for a spectrometer.

It includes a first member 41 and a second member 42, at opposite ends of the optical device 1, which include passive optical components 21p and 23p, respectively.

Second and fourth outer side panels 62, 64 of optical device 1 are visible in the cross-section of FIG. 11, whereas first and third outer side panels are above and below the drawing plane, respectively.

Base faces of the members 41, 42 are parallel to and attached to the first and third outer side panels.

The members 41, 42 are sections of the initial bars; the first and third outer side panels are sections of the first and third substrates, respectively, (which were included in the bar arrangement); and the second and fourth outer side panels are sections of the second and fourth substrates, respectively, (which were attached to the prism bars).

In outer side panel 64, a transparent portion 64a is provided which establishes an entrance slit in the otherwise non-transparent panel.

In outer side panel 62, a transparent portion 62a is provided to which a lens element 15 is attached, e.g., for focusing purposes. Otherwise, outer side panel 62 can be non-transparent panel.

One or more of the outer side panels 62, 64 can include protrusions functioning as baffles. In FIG. 11, merely as an example, baffles b2 and b4 of outer side panels 62 and 64, respectively, are drawn.

The transparent portions (such as transparent portions 62a and 64a) can be material, such as by including a transparent solid material (and no openings). But alternatively, any of the transparent portions can be an opening.

Instead of lens element 15, another passive optical component could be provided; and the corresponding item could, alternatively or in addition, also be present on the inside of the optical device.

Analogously, also at transparent portion 64a, a passive optical component could be provided.

The passive optical component 21p at member 41 can be, e.g., a focusing mirror.

The passive optical component 23p of member 42 can be, e.g., a curved diffraction grating.

A cavity 9" is enclosed by outer side panels 61, 62, 63, 64 and members 41, 42. This is an option for other embodiments, too. This protects the inside of the optical device, and in particular the surfaces of the of the passive optical components, from dirt.

The optical device 1 illustrated in FIG. 11 defines a light path (illustrated by dotted arrows) for light entering the optical device through entrance slit 64a. Along the light path, the light is subsequently focused by mirror 21p, freed from stray light by the baffle including, e.g., baffles b2, b4, then diffracted and focused by curved grating 23p, to finally exit the optical device while being focused again, by lens element 15. The path (and in particular the angle) along which the light exits the optical device depends on the wavelength of the light.

It can be sufficient to combine the optical device 1 of FIG. 11 with a detecting device such as a photodetector in order to obtain a full (but extremely small-sized) spectrometer.

Figure 12:
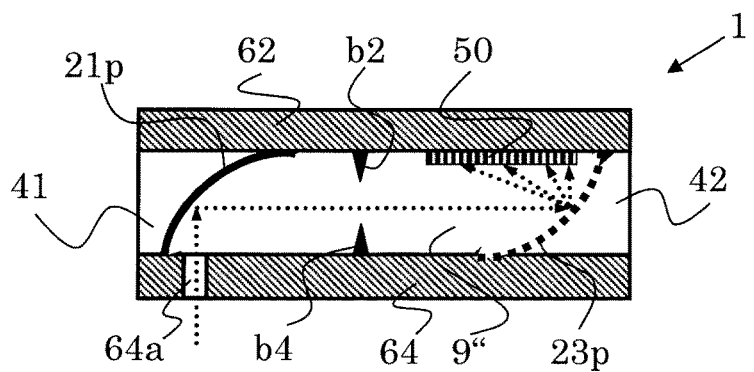
FIG. 12 a schematical cross-sectional view of a type II-like optical device constituting a spectrometer.

FIG. 12 is a schematical cross-sectional view of a type II-like optical device 1 constituting a spectrometer. This optical device is very similar to the one of FIG. 11, but it includes a detector 50, such as a one-dimensional or two-dimensional pixel arrangement, and the light path does not exit the optical device, but is detected by the detector 50, such that a transparent region 62a and a lens element 15 can be dispensed with. Second outer side panel 62 can be a printed circuit board to which detector 50 is attached and which has through contacts interconnecting electrical contacts of the detector 50 with outside contacts of the optical device (not specifically illustrated).

For more complex devices, two or more of the described optical devices can be combined in a compound optical device.

Producing compound optical devices can include, e.g., aligning a plurality of first prism bars relative to one another, so as to create a first prism bar arrangement, and aligning a plurality of second prism bars relative to one another, so as to create a second prism bar arrangement, and to attach the first prism bar arrangement to the second prism bar arrangement.

FIGS. 13a and 13b schematically illustrate a compound optical device 100 in a rear view and in a cross-sectional side view, respectively. In this example, the first outer side panels 61i and 61j of the first optical device 1i and of the second optical device 1j, respectively, are aligned to lie in one and the same plane.

FIGS. 14a and 14b schematically illustrate a compound optical device 100 in a rear view and in a cross-sectional top view, respectively. In this example, the first outer side panels 61i and 61j of the first optical device 1i and of the second optical device 1j, respectively, are aligned to lie in parallel, but distanced planes.

As is readily perceived from the sketched light paths (dotted lines), valuable degrees of freedom in the optical design are opened up by the stacking of prism bars (e.g., in prism bar arrangements) or of the parts obtained by sectioning the prism bars or of prism bar arrangements.

Further compound optical devices 100, e.g. as illustrated in a rear view in FIG. 15, can be produced when stacking is accomplished such that the first outer panel 61i of a first optical device 1i is aligned perpendicularly to the first outer panel 61j of a second optical device 1j.

FIG. 16 is a schematical rear view of an initial bar 2 including passive optical components 21p on a precursor bar 21x. Passive optical components 21p can be pre-manufactured ones which are placed on the precursor bar 21x. Or, in another embodiment, the passive optical components 21p are produced and/or shaped on the precursor bar, e.g., using a replication process. The passive optical components 21*p* can be separate ones constituting an optical component arrangement including a plurality of distinct passive optical components.

FIG. 17 is a schematical perspective view of an initial bar 2 with a continuous optical structure 21*n*. This continuous optical structure 21*n* can be, e.g., a curved mirror. It can be separated into distinct passive optical components at the time of producing the prism bars and of segmenting the bar arrangement, respectively. The outlined arrows indicate possible cutting planes.

The invention claimed is:

1. A method for manufacturing an optical device, the method comprising
    a) providing a plurality of bars referred to as initial bars, each initial bar extending along a respective initial-bar direction from a first bar end to a second bar end and having a first side face extending from the first bar end to the second bar end, a first optical component arrangement being present at the first side face;
    b) positioning the initial bars in a row with their respective initial-bar directions aligned parallel to each other and with their respective first side faces facing towards a neighboring one of the initial bars;
    c) fixing the plurality of initial bars with respect to each other in the position achieved in step b) to obtain a bar arrangement;
the method further comprising
    d0) obtaining bars referred to as prism bars by carrying out at least one of steps d), d'), d"):
    d) segmenting the bar arrangement into the prism bars each of which comprises a portion of at least two different ones of the plurality of initial bars, by conducting a plurality of cuts through the bar arrangement;
    d') segmenting the bar arrangement into the prism bars by separating the bar arrangement into sections along cut lines, wherein the cut lines are at an angle with the initial-bar directions;
    d") segmenting the bar arrangement into the prism bars by separating the bar arrangement into sections by creating cut faces which are at an angle with respect to the initial-bar directions;
    wherein the segmenting the bar arrangement into the prism bars comprises
        dx) dividing the first optical component arrangement for obtaining a plurality of passive optical components, wherein each of the prism bars comprises one or more of the passive optical components comprising a first reflective face each which is of non-planar shape;
the method further comprising
    e) segmenting the prism bars into parts.

2. The method according to claim 1, wherein step c) comprises attaching the initial bars to a first substrate.

3. The method according to claim 2, wherein the first substrate comprises at least one protrusion protruding between neighboring initial bars in the bar arrangement.

4. The method according to claim 3, wherein the protrusion functions as a baffle in the optical device.

5. The method according to claim 2, wherein the first substrate comprises at least one transparent portion adjoining open space present between neighboring initial bars in the bar arrangement.

6. The method according to claim 5, wherein the at least one transparent portion is a material transparent portion.

7. The method according to claim 1, wherein the first optical component arrangement comprises an array of distinct passive optical components.

8. An optical device comprising;
    a first outer side panel;
    a first member including a first base face and a second base face, and a first reflective face and a second reflective face, the second reflective face facing the first reflective face;
    wherein the first base face is aligned parallel to the first outer side panel and attached thereto;
    wherein at least one of the first and second reflective faces is of non-planar shape; and
    wherein the optical device further comprises
        a focusing element including the first or second reflective face; or
        the first outer side panel includes a baffle; or
        the first outer side panel includes a transparent portion.

9. An optical device comprising:
    a first outer side panel;
    a first member including a first base face, a second base face, a first reflective face, and a second reflective face, the second reflective face facing the first reflective face;
    a second member including a first further base face, a second further base face, and the second reflective face;
    a third outer side panel aligned parallel to the first outer side panel;
    a diffractive element including the first reflective face or the second reflective face;
    a focusing element including the first reflective face or the second reflective face;
    wherein the first base face is aligned parallel to the first outer side panel and attached thereto, wherein at least one of the first and second reflective faces is of non-planar shape;
    wherein the first further base face is aligned parallel to the first outer side panel and attached thereto, wherein the second base face and the second further base face are aligned parallel to the third outer side panel and attached thereto; and
    wherein the optical device defines an optical path for light entering the optical device, wherein light propagating along the optical path for light is diffracted by the diffractive element and focused by the focusing element.

10. The optical device of claim 9, further comprising an entrance slit at a beginning of the optical path for light and a collimating element situated along the optical path for light between the entrance slit and the diffractive element.

11. A compound optical device including a first optical device and a second optical device, the first optical device and the second optical device each comprising:
    a first outer side panel;
    a first member including a first base face, a second base face, a first reflective face, and a second reflective face, the second reflective face facing the first reflective face;
    wherein the first base face is aligned parallel to the first outer side panel and attached thereto, and wherein at least one of the first and second reflective faces is of non-planar shape; and
    wherein the first optical device and the second optical device are fixed relative to one another and the compound optical device defines a light path for light entering the compound optical device, wherein the light path runs inside the first optical device and inside the second optical device.

12. The compound optical device of claim 11, wherein the first optical device and the second optical device are stacked upon each other.

13. The compound optical device of claim 12, wherein the first outer side panel of the first optical device is aligned perpendicularly to the first outer side panel of the second optical device.

14. The compound optical device of claim 12, wherein the first outer side panel of the first optical device is aligned parallel to the first outer side panel of the second optical device.

15. The compound optical device of claim 14, wherein the first outer side panel of the first optical device and the first outer side panel of the second optical device are arranged in different planes, which are arranged at a distance to each other.

* * * * *